United States Patent Office 3,063,630
Patented Nov. 13, 1962

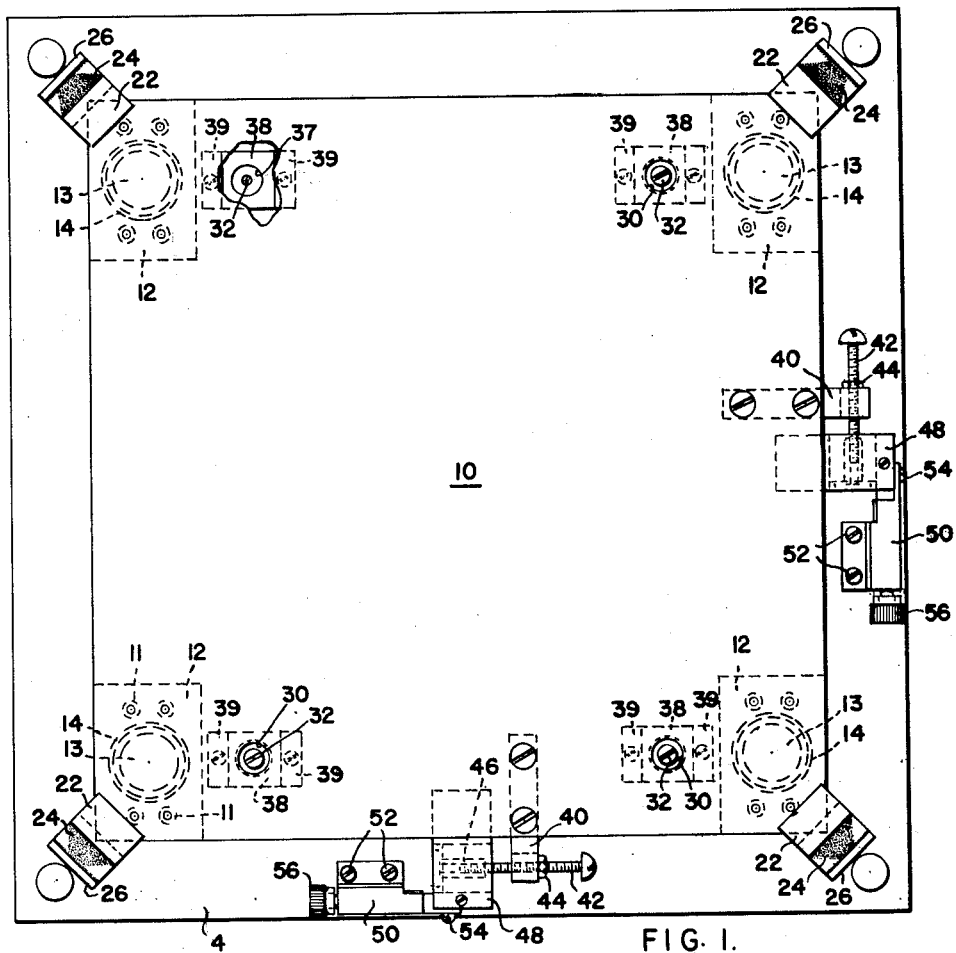
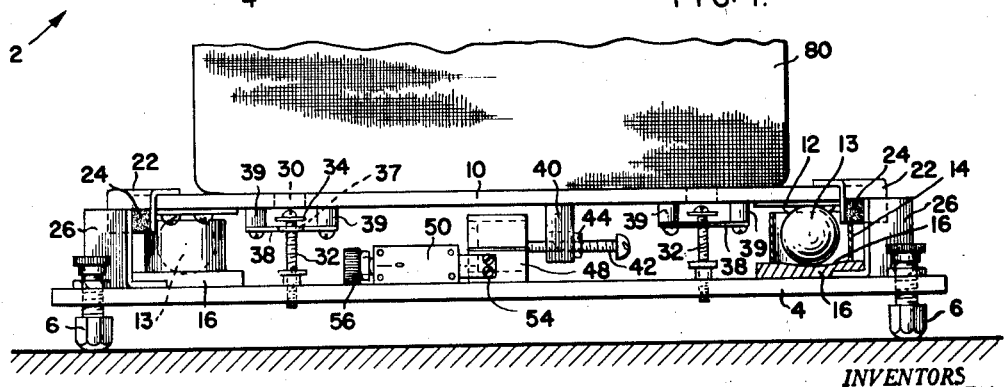
FIG. 1.
FIG. 2.
INVENTORS
WILLIAM H. CROMLEY
& DONALD J. HART
BY
ATTORNEYS

3,063,630
MOTOR ACTIVITY INDICATOR
William H. Cromley, Philadelphia, and Donald J. Hart, Merion, Pa., assignors to Smith Kline & French Laboratories, Philadelphia, Pa., a corporation of Pennsylvania
Filed May 28, 1959, Ser. No. 816,623
3 Claims. (Cl. 235—92)

This invention relates to a motor activity indicator which is of particular untility to obtain an indication of the motor activity of test animals such as rats, mice, dogs and monkeys. It is valuable, for example, in obtaining a comparison between the motor activity of a test animal before and after it has had administered to it a drug such as a tranquilizer in order to determine the effect of the drug on the animal's motor activity.

The indicator in accordance with this invention is advantageous in that it provides a very accurate count being capable of detecting very small movements by the animal. This is in contrast to the accuracy achieved by the widely used so-called "light-box" which is employed for the same purpose.

The indicator of this invention is further advantageous in that it can be constructed equally well for the detection of motion of relatively large animals such as dogs or monkeys or for relatively small animals such as rats or mice.

In accordance with this invention there is provided a platform which is supported so that it can move in the plane of the platform, i.e., substantially horizontally. The platform is located in a reference position by resilient means which oppose the movement of the platform and when the platform is moved, return it to the reference position. Movement of the platform is detected by electro-magnetic means providing an electrical signal on the movement of the platform. Means to count these signals is also provided.

The invention will be further clarified by the following description read in conjunction with the drawings in which:

FIGURE 1 is a plan view of an indicator in accordance with this invention;

FIGURE 2 is a front elevation of the indicator of FIGURE 1; and

Figure 3:
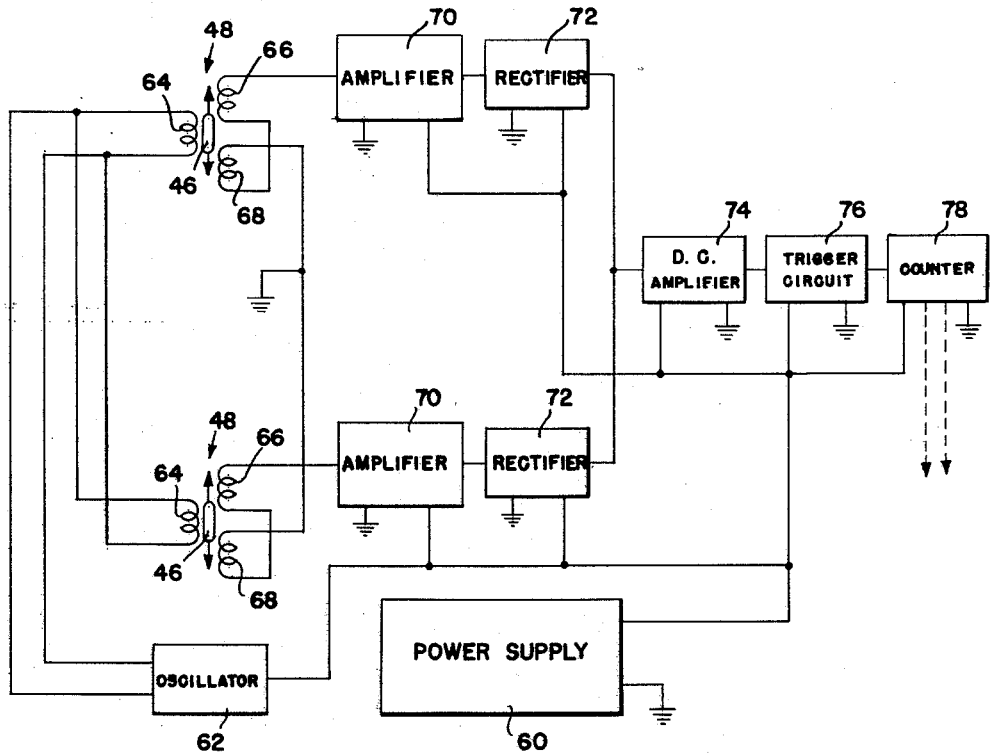
FIGURE 3 is a wiring diagram illustrating the electrical circuitry involved in the indicator of FIGURE 1.

As shown in FIGURES 1 and 2 a motor activity indicator 2 in accordance with this invention has a base 4 mounted on adjustable leg 6. A platform 10 has secured thereto at each corner by screws 11 a plate 12 which rests on a supporting ball 13. Ball 13 may be, for example, a steel ball. Each ball 13 is contained in a cup 14 having a dished out base 16 which tends to keep ball 13 centered. Base 16 in turn is secured to base 4.

At each corner of platform 10 there is provided a bracket 22 to which is adhered by a suitable adhesive a resilient member 24 which may be for example, of rubber such as sponge rubber, resilient member 24 is also adhered by an adhesive to a bracket 26 which is secured to base 4. Each resilient member 24 is slightly compressed and these members acting together locate platform 10 in a reference position.

Platform 10 is provided with four openings 30 each of which provides access to a machine screw 32 below platform 10. Each machine screw 32 has an enlarged head 34, passes through an opening 37 in a plate 38 and is threaded to base 4. Plate 38 is screwed to a pair of bosses 39, 39. Openings 37 are large enough to provide for the free movement of platform 10 in the horizontal plane but will not permit plates 38 to pass heads 34 and hence prevent the inadvertent removal of platform 10.

A pair of bars 40, 40 are secured to adjacent sides of platform 10 at 90° with respect to each other. Each bar 40 has threadably secured thereto a machine screw 42 carrying a lock nut 44. Each screw 42 is secured to a core 46 of a differential transformer 48. Before indicator 2 is placed in operation, i.e., when the reference platform 10 is in the reference position the screws 42 are employed to position the cores 46 close to the null position. The final adjustment to the null position is best accomplished by micrometers 50 secured to base 4 by screws 52 and each supporting the body of a transformer 48 at 54. Each micrometer 50 is adjusted by a knurled knob 56. The secondary coils of the transformers are wired so that when the core is in the centralized or null position, equal and opposite voltages are produced as will be seen in greater detail when FIGURE 3 is discussed.

Referring now to the wiring diagram of FIGURE 3, there is indicated at 60 a power supply which supplies power to an oscillator 62 which may generate any convenient frequency for example from 60 cycles per second to 10 kilocycles per second. The output of oscillator 62 is delivered to the primary winding 64, 64 of differential transformers 48, 48. Each transformer 48 is provided with secondary windings 66 and 68 wound in opposed relationship so as to deliver no output when core 46 is in the null position, the core as described above being adjusted to the null position when platform 10 is at rest in the reference position. The output from the secondary winding 66 and 68 of each transformer 48 is amplified by an amplifier indicated at 70. Each amplifier 70 is desirably of high gain so that minute deviations of the cores 46 from their null positions will provide outputs of considerable magnitude. The output from each amplifier 70 is delivered to a rectifier 72 whose output in turn is delivered to a D.C. amplifier 74. The output of amplifier 74 is employed to activate a trigger circuit 76 which in turn is employed to operate a counter indicated at 78. Power supply 60 is employed to supply power to amplifiers 70, rectifiers 72, amplifier 74, trigger circuit 76 and counter 78.

*Operation*

In operation a test animal is placed on platform 10, for example in a cage indicated at 80, in FIGURE 2. To illustrate the operation it can be assumed that the animal moved so as to move the platform to the right as viewed in FIGURE 1. This will result in core 46 of transformer 48 being moved to the right by the movement of the animal and then being returned to the null position by the action of resilient members 24. This excursion of core 46 will result in the output of a signal which will be amplified by amplifier 70 and then rectified by rectifier 72. The D.C. output of rectifier 72 is then amplified by amplifier 74 whose output is fed to trigger circuit 76 which will activate counter 78 which in turn will indicate one count. Thus, for a slight movement of platform 10 to the right incident to a slight movement of the animal one count will be indicated. It will be obvious that similar results will be achieved by a movement of the animal which causes platform 10 to move to the left from its reference point as viewed in FIGURE 1. Similarly, movements of platform 10 which are perpendicular to the aforesaid movements will result in the output of an electrical signal by differential transformer 48 located on the right-hand side of platform 10 as viewed in FIGURE 1. Frequently both cores 46 will be moved simultaneously which will result in a single additive signal being delivered to amplifier 74.

It will be obvious that the above described embodiment of the invention is intended to be illustrative and

What is claimed is:

1. A motor activity indicator comprising a platform, means supporting said platform for movement in the plane of the platform, resilient means opposing the movement of said platform and electro-magnetic means providing an electrical signal responsive to the movement of said platform, said electro-magnetic means including a pair of differential transformers operatively associated with said platform and positioned 90 mechanical degrees apart.

2. A motor activity indicator comprising a platform, a plurality of freely rotatable balls supporting said platform for movement in any direction in the longitudinal plane of said platform, resilient means opposing the movement of said platform, electro-magnetic means providing an electrical signal responsive to the movement of said platform along a first path in said plane of said platform and electro-magnetic means providing an electrical signal responsive to the movement of said platform along a second path in said plane of said platform and traverse to said first path.

3. A motor activity indicator comprising a platform, a plurality of freely rotatable balls supporting said platform for movement in any direction in the longitudinal plane of said platform, resilient means opposing the movement of said platform, transducer means providing an electrical signal responsive to the movement of said platform along a first path in said plane of said platform and transducer means providing an electrical signal responsive to the movement of said platform along a second path in said plane of said platform and traverse to said first path.

References Cited in the file of this patent

UNITED STATES PATENTS

| | | |
|---|---|---|
| 2,320,390 | Shmurak | June 1, 1943 |
| 2,618,970 | Hitchcock et al. | Nov. 25, 1952 |
| 2,680,438 | Edwards | June 8, 1954 |
| 2,688,873 | Burris-Meyer | Sept. 14, 1954 |
| 2,794,951 | Broding et al. | June 4, 1957 |